(12) United States Patent
Barge

(10) Patent No.: US 8,083,462 B2
(45) Date of Patent: Dec. 27, 2011

(54) APPARATUS FOR PLACING BATTERY PLATES IN A LINE

(75) Inventor: Christopher S. Barge, Bristol (GB)

(73) Assignee: TBS Engineering Limited, Cheltenham (GB)

( * ) Notice: Subject to any disclaimer, the term of this patent is extended or adjusted under 35 U.S.C. 154(b) by 265 days.

(21) Appl. No.: 12/098,647

(22) Filed: Apr. 7, 2008

(65) Prior Publication Data

US 2008/0253867 A1 Oct. 16, 2008

Related U.S. Application Data

(60) Provisional application No. 60/911,190, filed on Apr. 11, 2007.

(51) Int. Cl.
*B27D 5/00* (2006.01)
*B65G 49/05* (2006.01)
*B65G 49/06* (2006.01)
*B65H 5/22* (2006.01)
*B65H 5/08* (2006.01)

(52) U.S. Cl. .......... 414/797.2; 414/797; 198/689.1; 271/197; 271/300

(58) Field of Classification Search .......... 198/689.1; 271/108, 11, 197, 90, 96, 98; 414/793, 793.1, 414/796.5, 796.9, 797, 797.2–797.3, 797.6–797.8
See application file for complete search history.

(56) References Cited

U.S. PATENT DOCUMENTS

| | | | | |
|---|---|---|---|---|
| 3,131,929 A | * | 5/1964 | Karl | 271/94 |
| 3,305,233 A | * | 2/1967 | Cody | 271/180 |
| 3,463,483 A | * | 8/1969 | Seay et al. | 271/11 |
| 3,476,241 A | * | 11/1969 | Ungerer | 209/643 |
| 3,477,558 A | | 11/1969 | Fleischauer | |
| 3,480,160 A | * | 11/1969 | Barradell-Smith et al. | 414/789.1 |
| 3,830,489 A | * | 8/1974 | Adams | 271/9.12 |
| 4,067,458 A | * | 1/1978 | Schneider et al. | 414/796.7 |
| 4,211,398 A | * | 7/1980 | Bishop | 271/9.01 |
| 4,412,738 A | * | 11/1983 | Ahern et al. | 355/76 |
| 4,635,921 A | * | 1/1987 | Thomas | 271/94 |

(Continued)

FOREIGN PATENT DOCUMENTS

DE 1 923 441 A1 1/1971

(Continued)

OTHER PUBLICATIONS

European Search Report for Application No. GB0604831.8 dated Jun. 29, 2006.

(Continued)

*Primary Examiner* — Gregory Adams
(74) *Attorney, Agent, or Firm* — Marshall, Gerstein & Borun LLP

(57) ABSTRACT

This invention relates to apparatus for placing battery plates in a line. This includes a pick up and release unit generally indicated at 16. The unit includes a central metal hollow body 17, which is divided into a number of side-by-side vacuum chambers, some of which have a perforate floor 19. A vacuum course 21 can be selectively connected to those, which have a perforate floor, whilst it is perpendicularly connected to a second set of chambers. Plates can be picked up from elevators 11 and 12 by use of the intermittent vacuum and then held against an endless belt 25 by the constant vacuum until they arrive at a release chamber, having a perforate floor, where upon interruption of the vacuum allows for release of the battery plate.

8 Claims, 2 Drawing Sheets

U.S. PATENT DOCUMENTS

| | | | |
|---|---|---|---|
| 4,784,380 A | | 11/1988 | Eberle |
| 4,871,348 A | | 10/1989 | Konaka |
| 4,997,178 A | * | 3/1991 | Ogoda .......................... 271/276 |
| 5,671,920 A | | 9/1997 | Acquaviva et al. ........... 271/307 |
| 5,899,341 A | | 5/1999 | Irita |
| 6,030,171 A | | 2/2000 | Johnson et al. |
| 6,131,901 A | * | 10/2000 | Hirohata ....................... 271/276 |
| 6,419,217 B1 | * | 7/2002 | Hartmann et al. ......... 270/52.12 |
| 6,736,589 B2 | | 5/2004 | Sichera et al. |
| 6,966,742 B2 | * | 11/2005 | Tokita et al. ............... 414/789.5 |
| 6,971,838 B2 | | 12/2005 | Johnson et al. |
| 7,007,940 B2 | * | 3/2006 | Polidoro et al. ............. 271/3.11 |
| 7,007,942 B1 | * | 3/2006 | Stearns et al. ................... 271/11 |
| 2009/0292398 A1 | | 11/2009 | Hopwood et al. |

FOREIGN PATENT DOCUMENTS

| | | | |
|---|---|---|---|
| DE | 3806419 A1 | * | 9/1989 |
| EP | 18057 A2 | * | 10/1980 |
| EP | 0 860 259 A2 | | 8/1998 |
| EP | 0 950 624 A2 | | 10/1999 |
| EP | 1 031 523 A2 | | 8/2000 |
| EP | 1 295 823 A1 | | 3/2003 |
| EP | 1 608 574 | | 12/2005 |
| FR | 1546148 A | | 11/1968 |
| GB | 2 092 117 | | 8/1982 |
| GB | 2 092 117 A | | 8/1982 |

OTHER PUBLICATIONS

International Search Report for Application No. PCT/GB07/000835 dated Jun. 27, 2007.

European Search Report for European Application No. 08251050 dated Jul. 12, 2011.

Chinese Office action for Application No. 200810091655.9 dated Aug. 24, 2011.

Mexican Office action for Application No. MX/a/2008/004853 dated Mar. 30, 2011.

Mexican Office action for Application No. MX/a/2008/004853 dated Sep. 5, 2011.

* cited by examiner

APPARATUS FOR PLACING BATTERY PLATES IN A LINE

CROSS-REFERENCE TO RELATED APPLICATION

This patent claims benefit under 35 U.S.C. §119(e) to U.S. Provisional Application Ser. No. 60/911,190, filed Apr. 11, 2007, the disclosure of which is hereby expressly incorporated herein for all purposes.

TECHNICAL FIELD

This invention relates to apparatus for placing battery plates in a line from a stack of plates.

BACKGROUND

In the applicant's co-pending application PCT/GB07/000835 a novel and particularly quick apparatus for placing battery plates in a line from a stack of plates is described. The specific embodiment relies on a carousel of vacuum heads. The apparatus works extremely well, but it has a high and expensive component count and requires particularly sophisticated control.

The present invention consists of an apparatus for placing battery plates in a line from a stack of plates including an elevator for receiving a stack of plates and for sequentially elevating the stack to maintain, in use, the uppermost plate in the stack in a datum region lying between two parallel generally horizontal planes and the polarity of vacuum heads arranged in the closed loop for sequentially passing over the elevator with a fixed gap from the upper plane of the datum range for picking up the uppermost plate and subsequently releasing the plate at a release position wherein the apparatus includes an endless horizontal belt having a plurality of spaced perforate portions, which respectively constitute the vacuum heads, a vacuum chamber located adjacent the datum region for acting in a sense to lift the uppermost plate from this stack and the motor for rotating the belt whereby the perforate portions pass sequentially over the vacuum chamber.

This approach has a number of advantages. Firstly the component count is significantly decreased, in particular because the vacuum chamber does not have to move; it is only the endless belt that needs to move. Secondly the application of the vacuum is strictly along the longitudinal axis of the stack, whereas in the aforementioned PCT application, the vacuum sweeps over the plate. Conveniently, the aerodynamic effect of the moving belt is to reduce the pressure immediately above the plate and cause the uppermost plate to separate from the stack, before the vacuum is applied as the perforate portion passes over the vacuum chamber.

Conveniently the vacuum chamber has an open or perforate wall over which the perforate portions pass and, additionally or alternatively, a valve may be provided for determining whether or not the vacuum chamber is at a negative pressure.

There may be at least two elevators spaced in the direction of travel of the belt and a vacuum chamber may be associated with each elevator.

In a particularly convenient construction, the apparatus includes a body around which the belt runs and the body defines two sets of vacuum chambers; the first set including the first mentioned vacuum chamber or chambers and a second set including one or more chambers for providing, with the first set, a continuous vacuum path from the datum region to the release position.

The second set of vacuum chambers may provide a continuous constant vacuum so that plates are held to the belt as they move to the release position. At the release position it is preferred that there is a further switchable vacuum chamber, so that the plate can be actively released, but the release position could be formed simply by an absence of a vacuum chamber at that location.

Although the invention has been defined above, it is to be understood that it includes any inventive combination of the features set out above or in the following description.

BRIEF DESCRIPTION OF THE DRAWINGS

The invention may be performed in various ways and a specific embodiment will be described, by way of example, with reference to the accompanying drawings in which.

DETAILED DESCRIPTION

Figure 1:
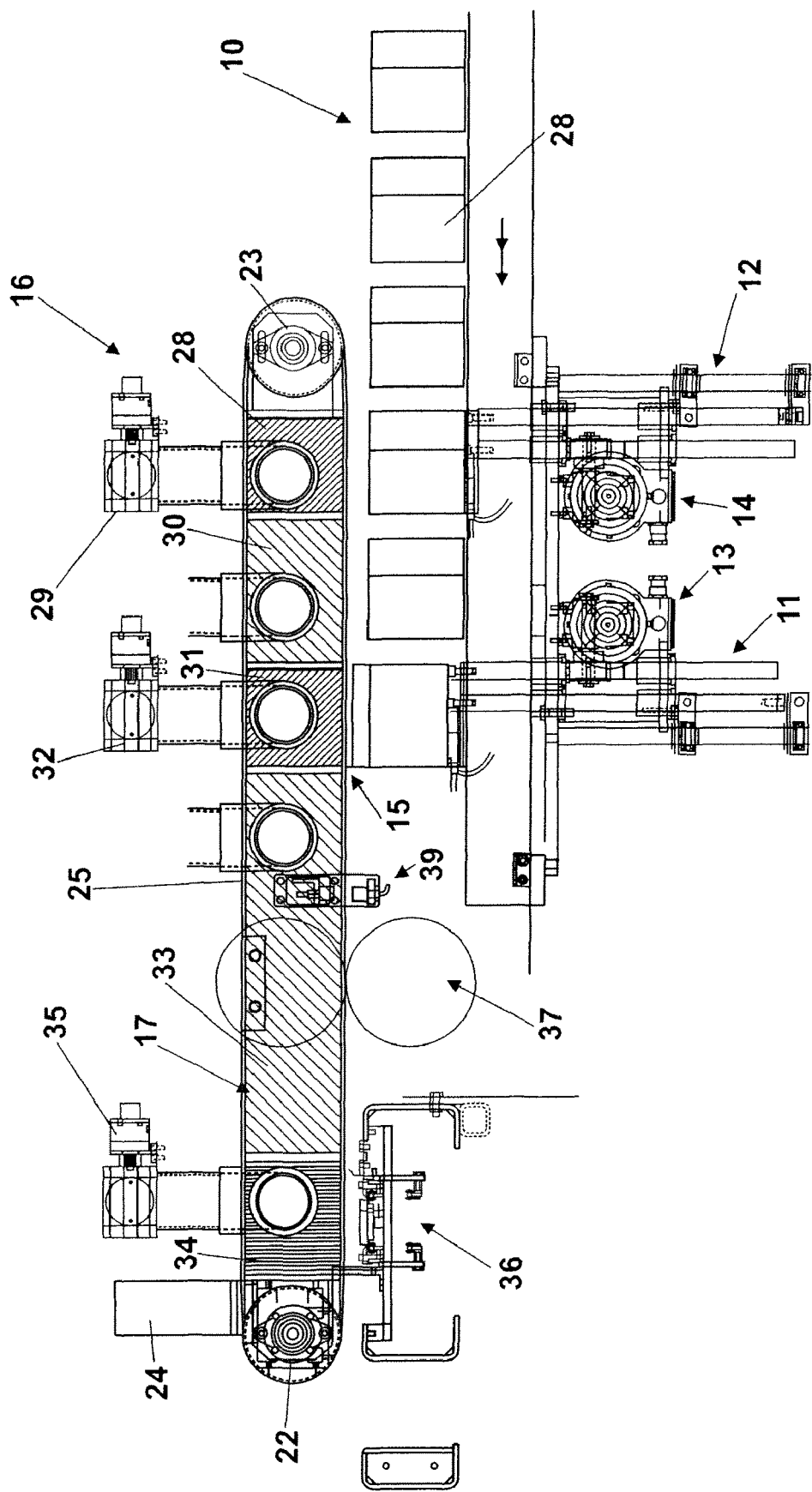
FIG. 1 is a side view, partly in section, of the apparatus for lifting plates.

As can best be seen in FIG. 1 a conveyor, generally indicated at 10 feeds in stacks of plates, from right to left, so that they are captured on one or other of the elevators 11, 12.

The elevators 11, 12 are driven by respective motors 13, 14 to lift a respective stack from the conveyor 10 and to sequentially elevate the stack so that the uppermost plate in the stack lies within a datum region 15. The control of the elevators 11 and 12 is such that, preferably, only one stack has a plate in the datum region at any one time.

Figure 3:
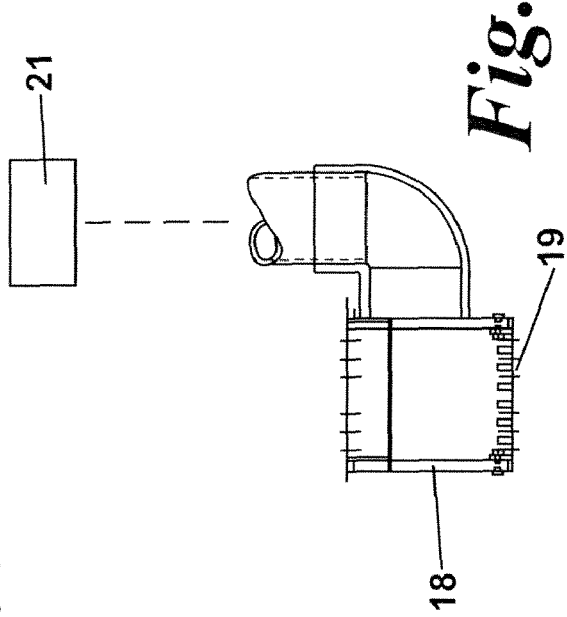
FIG. 3 is a scrap section through one of the vacuum chambers.

A pick up and release unit is generally indicated at 16. This comprises a central metal hollow body 17 which is divided into a number of side by side vacuum chambers, one of which 18 is shown illustratively in FIG. 3. Each vacuum chamber 18 consists of a hollow chamber with a perforate floor 19 and an outlet 20, which is connected to a vacuum source 21. As will be described in more detail below, for a first set of chambers a valve is provided between the chamber 18 and the vacuum source 21 so that the chamber 18 can either be at negative pressure or not. A second set of chambers is constantly connected to the vacuum source 21. The floor 19 can be any suitable form of grid and indeed, it notionally could be open, although that would create potential problems of particles getting into the vacuum system and with belt stability as will be indicated below.

As can be seen in FIG. 1 the body 17 forms, effectively, an elongate rectangular box. Sprockets 22, 23 are provided at respective ends of the body 17 and sprocket 22 can be driven by a motor 24. An endless belt 25 is mounted around the body 17 on the sprockets 22, 23 so that it can be driven around the body 17, with its underside travelling in a right to left direction.

Figure 2:
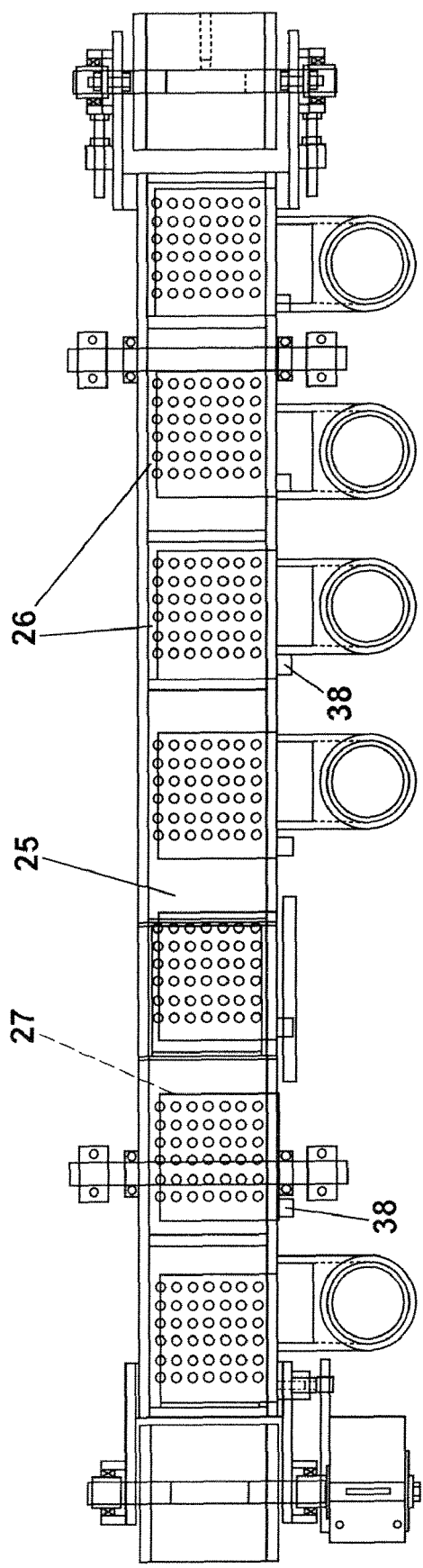
FIG. 2 is a plan view of the apparatus of FIG. 1.

As can be seen in FIG. 2 the belt 25 has a plurality of perforate portions 26 spaced along its length, and each perforate portion 26 may be an array of perforation. The cross sectional area of the perforate portions 26 are substantially similar to the cross section of a plate 27 of the type shown in the stacks 28. It will be understood that when a perforate portion 26 is aligned with a perforate floor 19 of a vacuum chamber 18 suction will pass through the belt 25.

The arrangement of vacuum chambers 18 in the body 17, from right to left, is as follows:

(a) Chamber 28 is a pick up chamber which has a valve 29.

(b) Chamber 30 is a constant vacuum chamber (c) Chamber 31 is a second pick tip chamber having a valve 32
(d) Chamber 33 is a constant vacuum chamber and
(e) Chamber 34 is a release chamber having a valve 35.

The release chamber 34 lies above a conveyor 36 onto which the plates are to be released to form a continuous line for passing to a group forming machine of the type which is well known to the person skilled in the art.

Also shown in the apparatus are a lug brushing station 37, which prepares lugs 38 on the battery plates 27 for a subsequent lead casting operation and a double plate sensor 39 for detecting if two plates have been picked up in error.

In operation, the motor 24 rotates the belt 25 so that its underside passes from right to left along the bottom of the body 17. One or other of the elevators 11, 12 raises its stack until its uppermost plate lies within the datum region 15. In FIG. 1 it is elevator 11 which is in this condition. As a perforate portion 26 sweeps past the vacuum chamber 31, the uppermost plate will be exposed to the vertical lift created by the vacuum in the chamber 31 and the plate will be held against the belt 25. It is retained in that position by the vacuum in chamber 33 until the perforate portion 26 reaches chamber 34. When it has arrived valve 35 is closed cutting off the vacuum source 21 and allowing the plate 27 to be dropped onto the conveyor 36.

Although in theory it is possible to run the apparatus without the use of the valves 29, 32 and 35, it is preferred that they are operated to put their chamber into the operative position at the moment when there is full overlap between the perforate portion 26 and the floor 19, so that there is a precise vertical lift or drop, rather than a progressive drag. As the belt 25 travels very close to the uppermost part of the stack, the air dragged round by the belt accelerates through the gap causing a reduced pressure over the uppermost plate which acts to separate it from the next plate in the stack. When the stack on the elevator 11 is almost used up, the elevator 12 will begin to elevate its stack towards chamber 28 and it plates 27 will be picked up adjacent chamber 28. It is this condition which is actually illustrated in the plan view of FIG. 2 and it will be observed the plates 27 are adjacent each of the chambers on the underside of 25.

This configuration can operate as quickly as the carousel arrangement described in the aforementioned PCT application, but because the vacuum chambers are fixed, it is much cheaper to manufacture than to service and the fixed chambers provide an improved lift, because they are only acting along the longitudinal axis of the stack.

We claim:

1. Apparatus for placing battery plates in a line from a stack of plates including an elevator for receiving a stack of plates and for sequentially elevating the stack to maintain, in use, the uppermost plate in the stack in a datum region lying between two parallel generally horizontal planes and a plurality of vacuum heads arranged in a closed loop for sequentially passing over the elevator with a fixed gap from the upper plane of the datum range for picking up the uppermost plate and for subsequently releasing the plate at a release position wherein the apparatus includes an endless horizontal belt having a plurality of arrays of perforations, wherein each array of perforations is longitudinally spaced from an adjacent array of perforations by an unperforated portion of the belt, and wherein the plurality of arrays of perforations respectively constitutes the vacuum heads, a vacuum chamber located adjacent the datum region for lifting the uppermost plate from the stack, wherein the vacuum chamber has an open or perforate wall over which the arrays of perforations pass, a motor for rotating the belt whereby the arrays of perforations pass sequentially over the vacuum chamber, and a valve for determining whether or not the vacuum chamber is at a negative pressure.

2. Apparatus as claimed in claim 1 including at least two elevators spaced in the direction of travel of the belt and a vacuum chamber associated with each elevator.

3. Apparatus as claimed in claim 1 including a body around which the belts run, the body defining two sets of vacuum chambers, the first set including the first mentioned vacuum chamber or chambers and the second set including one or more chambers for providing with the first set a continuous vacuum path from a datum region to the release position.

4. Apparatus as claimed in claim 1 further including a switchable vacuum chamber at the release position.

5. Apparatus as claimed in claim 2 including a body around which the belts run, the body defining two sets of vacuum chambers, the first set including the first mentioned vacuum chamber or chambers and the second set including one or more chambers for providing with the first set a continuous vacuum path from a datum region to the release position.

6. Apparatus as claimed in claim 2 further including a switchable vacuum chamber at the release position.

7. Apparatus as claimed in claim 3 further including a switchable vacuum chamber at the release position.

8. Apparatus as claimed in claim 5 further including a switchable vacuum chamber at the release position.

* * * * *